March 31, 1953 E. G. ROEHM ET AL 2,633,061
MILLING MACHINE CONTROL MECHANISM
Original Filed Oct. 3, 1942 4 Sheets-Sheet 1

INVENTORS
ERWIN G. ROEHM
BY HANS FRITSCHI
H. H. Parsons & L. W. Wright,
ATTORNEYS

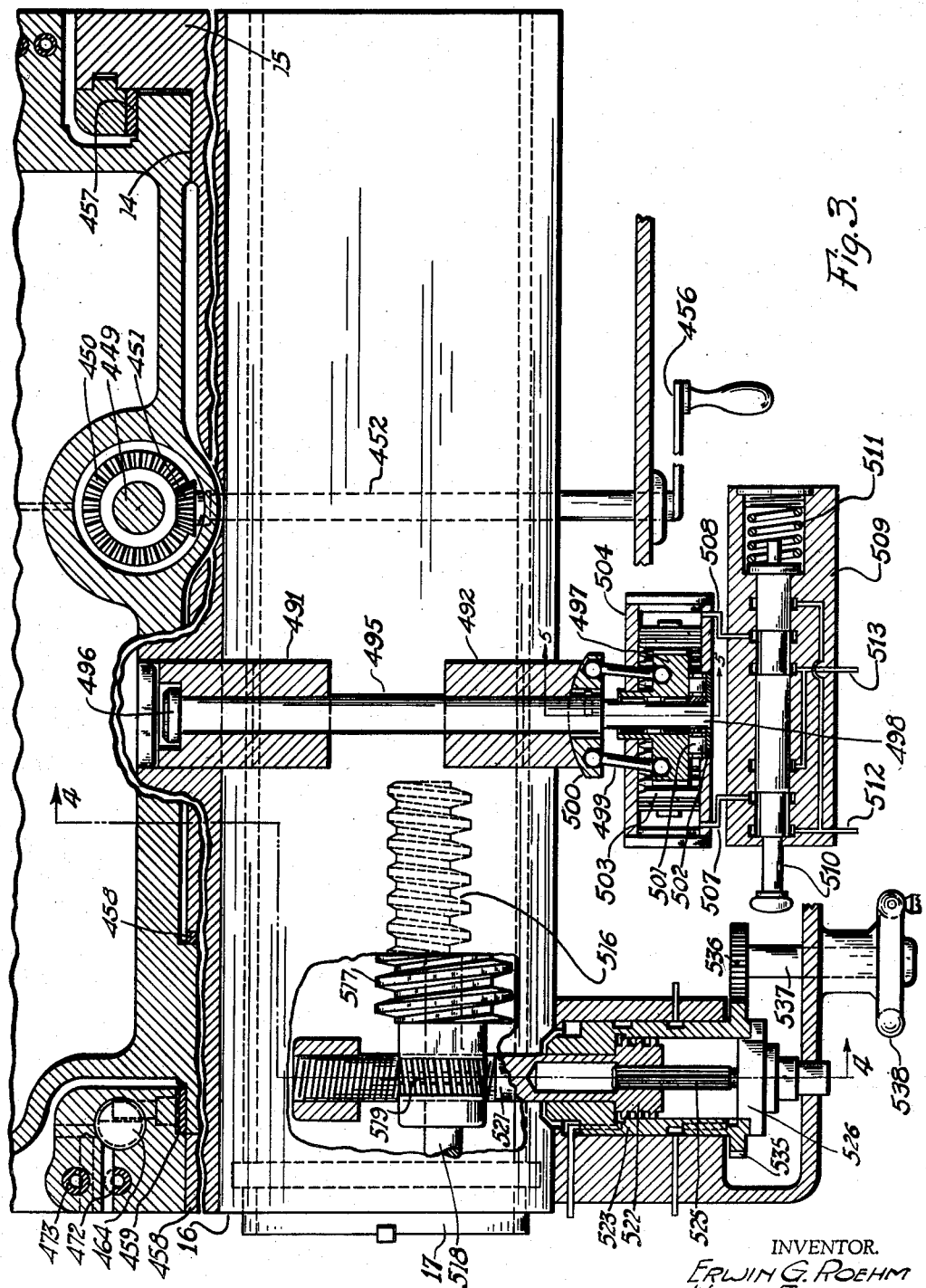

March 31, 1953    E. G. ROEHM ET AL    2,633,061
MILLING MACHINE CONTROL MECHANISM
Original Filed Oct. 3, 1942    4 Sheets-Sheet 3

INVENTOR.
ERWIN G. ROEHM
HANS FRITSCHI
BY Leigh W. Wright
ATTORNEY

March 31, 1953 E. G. ROEHM ET AL 2,633,061
MILLING MACHINE CONTROL MECHANISM
Original Filed Oct. 3, 1942 4 Sheets-Sheet 4

INVENTOR.
ERWIN G. ROEHM
HANS FRITSCHI
BY Leigh W. Wright
ATTORNEY

Patented Mar. 31, 1953

2,633,061

UNITED STATES PATENT OFFICE 2,633,061

MILLING MACHINE CONTROL MECHANISM

Erwin G. Roehm, Norwood, and Hans Fritschi, Amberley Village, Ohio, assignors to The Cincinnati Milling Machine Co., Cincinnati, Ohio, a corporation of Ohio Application July 8, 1946, Serial No. 681,854, which is a division of application Serial No. 460,706, October 3, 1942, now Patent No. 2,489,227, dated November 22, 1949. Divided and this application October 15, 1949, Serial No. 121,614

8 Claims. (Cl. 90—16)

This invention relates to machine tools and more particularly to improvements in milling machines.

One of the objects of this invention is to provide in a milling machine a new and improved means for automatically shifting the tool between two different positions at predetermined points in the traverse of the work support.

Another object of this invention is to provide a new improved mechanism for obtaining rise and fall of the spindle carrier of a milling machine automatically under control of a moving work support.

A further object of the invention is to provide a new and improved mechanism for effecting axial advance and retraction of a milling machine spindle automatically under control of a moving work support.

An additional object of this invention is to provide in a milling machine having a spindle capable of axial and lateral movement, separate power operable means for effecting each direction of movement and a common trip actuated control mechanism selectively coupleable for control of either power operable means from a moving support.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 3 is a horizontal section with parts broken away as viewed on the line 3—3 of Figure 1.

This application is a division of our copending application for milling machines filed in the United tates Patent Office on July 8, 1946, Serial No. 681,854, which is a division of application No. 460,706, filed October 3, 1942, now Patent No. 2,489,227, issued November 22, 1949.

Figure 1:
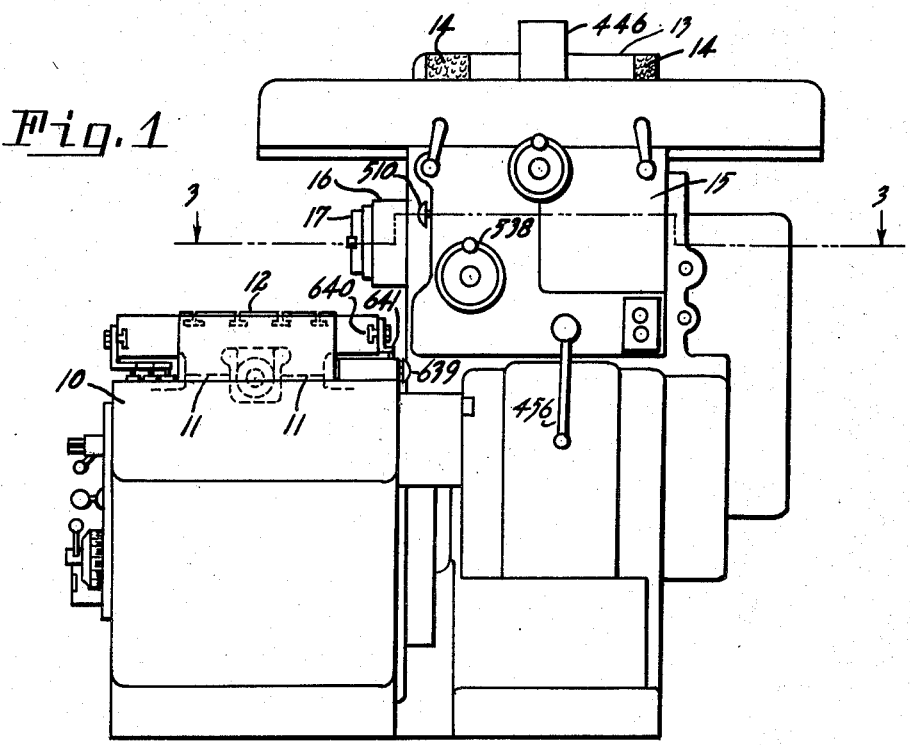
Figure 1 is a right elevation of a machine tool embodying the principles of this invention.

Referring to the drawings, Figure 1 is a right elevation of a machine tool, such as a milling machine, embodying the principles of this invention, and from this figure it will be noted that the machine is of the bed type, comprising a bed 10 upon the top of which is formed guideways 11 for supporting a table 12 for power actuated horizontal movement; and an upstanding column or head stock 13 which is integrally connected to the bed and provided with guideways 14 formed on one face thereof for receiving a spindle carrier 15 which is vertically movable with respect to the top of the table 12. The spindle carrier has a quill 16 which is slidably mounted in the carrier for horizontal axial adjustment, and a cutter spindle 17 is journaled within the quill for movement therewith. The spindle may be driven by suitable transmission means not shown, but which may be the same as that shown in parent application, Serial 681,854 supra.

Figure 2:
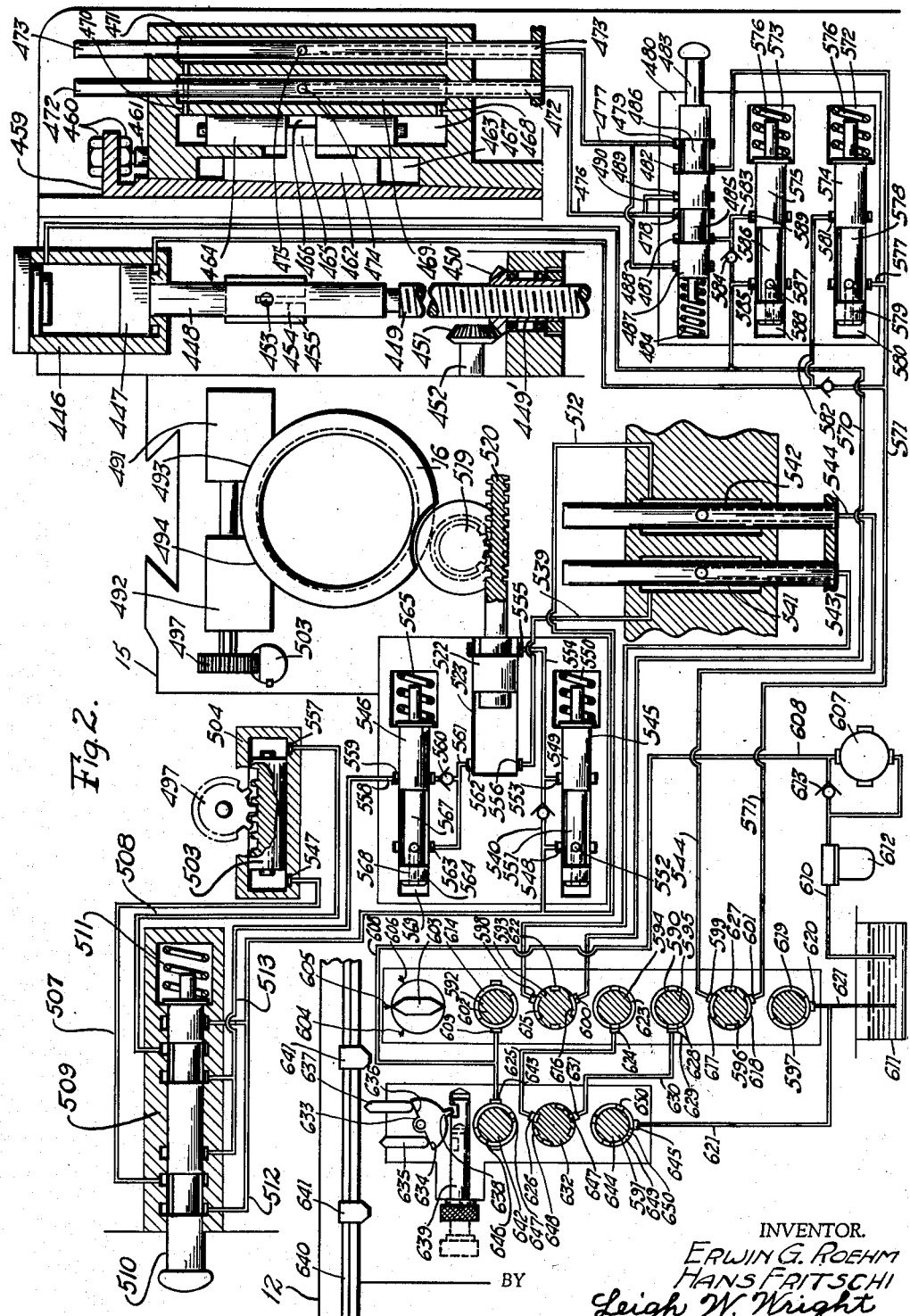
Figure 2 is a diagram of the hydraulic control circuit for controlling elevation and clamping of the spindle carrier and power means for shifting and clamping the quill.

The spindle carrier elevating control mechanism is shown diagrammatically in Figure 2. Means are provided whereby the carrier may be vertically adjusted by hand, or alternatively it may be power adjusted automatically under control of the work table where it is desirable to move the cutter into and out of engagement with the work during traverse of the table. The elevating mechanism for effecting the vertical adjustment comprises a cylinder 446 which, as shown in Figure 1, is formed integral with the headstock 13, and this cylinder contains a piston 447, Figure 2, formed on the end of a piston rod 448, the rod having a threaded portion 449 to serve as an elevating screw. This screw passes through a nut 449' which is anti-frictionally supported in the carrier for rotation, the rotation being accomplished by forming bevel gear teeth 450 on one end of the nut for interengagement with an actuating bevel gear 451 attached to the end of a shaft 452. Since carrier movement is accomplished by rotating the nut, means are provided for holding the screw against rotation, and this comprises a pin 453 which extends radially from the piston rod into a longitudinal slot 454 formed in a fixed sleeve 455. The sides of the pin may be flattened to prevent wear. The shaft 452 extends to the outside of the carrier as shown in Figures 1 and 3 where it is provided with an operating lever 456.

The carrier 15 is fitted to the guideways 14 by means of three gibs 457, 458, and 459, and means are provided for clamping the carrier by providing a fluid operable clamping member in connection with the gib 459 because this gib is close to the cutting end of the spindle carrier. The gib 459, as shown in Figure 2, is adjusted to a predetermined position by a pair of clamping nuts 460 which are threaded on a fixed stud 461 mounted in the carrier. A wedge-shaped clamping member 462 is slidably mounted in an aperture 463 formed in back of the gib, and this clamping member is operatively connected to a piston 464 by means of a tongue 465 which fits in a groove 466 formed in the piston.

One end of the cylinder 467 which contains the piston 464 is connected by a port opening 468 to a cylindrical chamber 469. The other end of the cylinder is connected by a second port 470 to a cylindrical chamber 471. Tubular members 472 and 473, which are smaller in diameter than the cylindrical chambers, pass through these chambers and through opposite ends of the housing for the purpose of conducting pressure to these chambers without creating unbalanced axial pressures on the carrier in either direction.

These tubular members are attached at one end to the bed and have a sliding connection with the carrier. The members 472 and 473 have bores formed in one end which extend part way of the length of these members where they intersect cross bores 474 and 475 for delivering fluid to or from the chambers. When pressure is admitted to the bore of member 472 and port 468, the piston 464 is urged upward to effect a clamping action, and when pressure is admitted through the member 473 and port 470, the piston 464 is moved downward to effect unclamping the spindle carrier.

The tubes 472 and 473 are connected by channels 476 and 477 to ports 478 and 479 of a reversing valve indicated generally by the reference numeral 480. This valve has a pair of ports 481 and 482 which may be alternately connected to pressure and exhaust. The valve has a plunger 483 which is normally held in the position shown by a spring 484 whereby the port 481 is connected to port 478 and port 482 is connected to port 479 by the annular grooves 485 and 486 respectively.

It will be obvious that if the port 481 is connected to pressure by means to be described and the port 482 is connected to exhaust that the piston 464 will be actuated in a direction to clamp the carrier.

This valve has been provided to make it possible for the operator to release the clamp during manual actuation of the elevating mechanism. The valve is mounted in the bed in convenient relation to the elevating operating handle 456 so that by depressing the plunger 483 against the resistance of spring 484 with one hand, the clamp will be released and the operator may rotate the handle 456 with the other hand. When this is done the port 481 is connected by the annular groove 485 to a port 487 which is connected by a branch line 488 to channel 477, and the port 482 is interconnected by the annular groove 486 to port 489 and thereby through branch 490 to channel 476. Thus, the connections are reversed between the ports 481 and 482 and the channels 476 and 477.

Means have also been provided for shifting and clamping the quill in various positions, the clamping mechanism being a power actuated clamp, and the shifting mechanism being so designed that it may be operated either by hand or by power. The power operation is so coupled that the quill may be advanced or retracted in cyclic operation with movements of the table.

Figures 4A, 5:
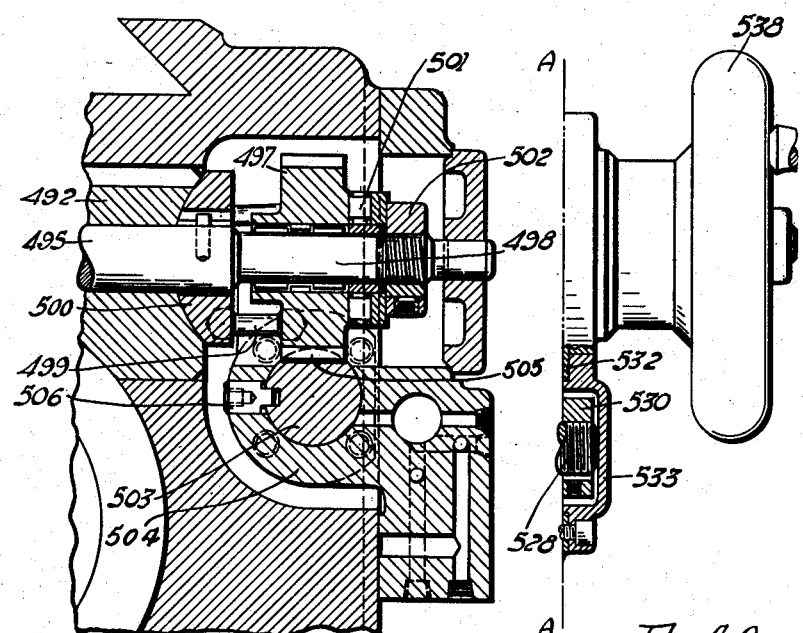
Figure 4A is a continuation of Figure 4 from line A—A.
Figure 5 is a detail section on the line 5—5 of Figure 3.

The quill clamping mechanism comprises a pair of fractional clamping members 491 and 492, Figures 2 and 3, which have arcuate surfaces 493 and 494 for frictionally gripping the periphery of the quill. An operating rod 495 passes through these members over the top of the quill as shown in Figure 3, and one end of the rod is provided with a head 496 for exerting a pull on the member 491. The rod 495, as shown in Figure 5, is provided with a pinion 497 which is supported for free rotation on the reduced end 498 of the rod. A series of toggle pins 499 are interposed between the pinion 497 and a plate 500 which engages the end of the clamping member 492. An anti-friction thrust bearing 501 is interposed between the pinion and a nut 502 which is threaded on the end of the clamp rod 495 whereby upon rotation of the pinion in one direction the toggle pins are urged in a direction parallel to the rod 495 whereby the members 491 and 492 are urged toward one another to clamp the quill; and upon rotation in the other direction the toggle members are moved at an angle to the axis to release the clamping members.

The pinion 497 is rotated by a piston 503 which is slidably mounted in a cylinder 504, the cylinder being open in the middle to permit intermeshing of rack teeth 505, formed on the top of the piston 503, with the pinion 497. A pin 506 may be provided in the cylinder for engagement with the piston to hold the same against rotation.

The opposite ends of the cylinder are connected by channels 507 and 508, Figure 2, to a reversing valve indicated generally by the reference numeral 509. This valve has a plunger 510 which is normally held in the position shown by a spring 511 for interconnecting channels 512 and 513 with channels 507 and 508. When the plunger 510 is moved against the resistance of the spring 511 these connections are reversed, thereby releasing the clamp.

Figure 6:
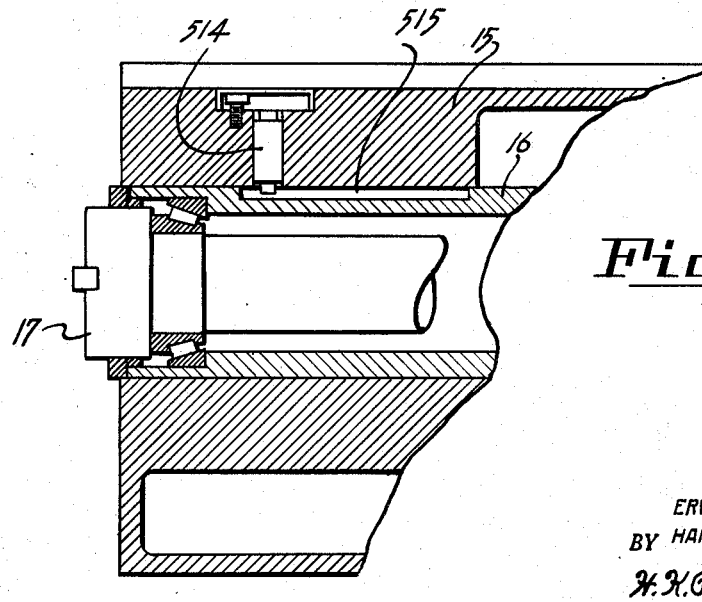
Figure 6 is a detail section showing the manner of splining the quill.
Figure 4:
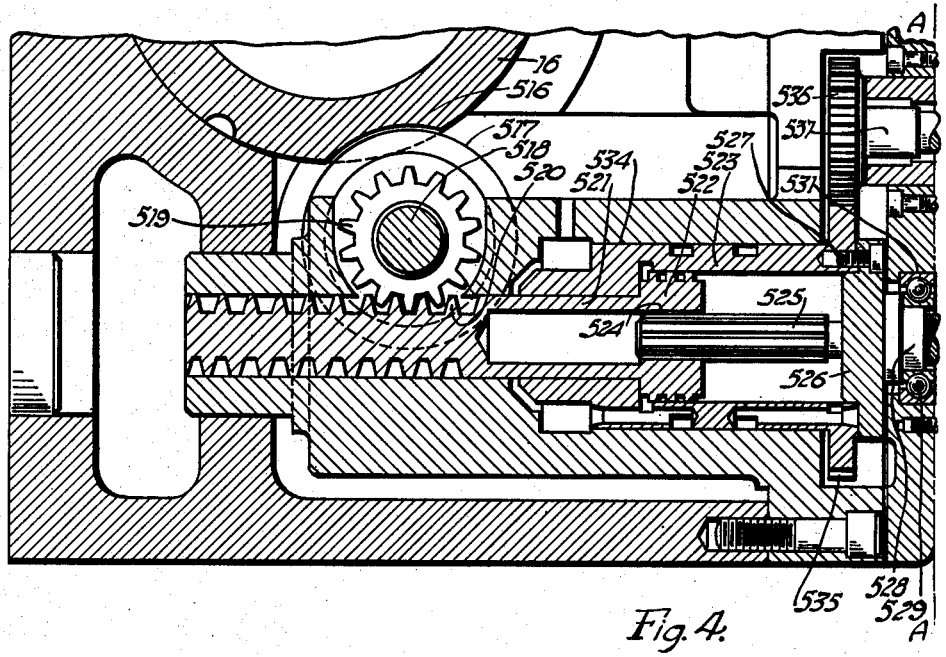
Figure 4 is a vertical section through a portion of the spindle carrier as viewed on the line 4—4 of Figure 3.

The quill is held against rotation by a pin 514 which, as shown in Figure 6, is mounted in the wall of the carrier and has flattened ends which project into a slot 515 formed longitudinally of the quill. The elongated slot permits axial movement of the quill. This axial movement is accomplished by cutting a partial nut thread 516 in the undersurface of the quill as shown in Figures 3 and 4 and providing a rotatable screw 517 in mesh with the nut thread which produces the ultimate effect of a schew and nut. The screw 517 is held against axial movement whereby rotation of the screw will effect axial movement of the quill. The screw is fastened to a shaft 518 to which is also attached a pinion 519. The pinion meshes with a screw thread 520 formed on a piston rod 521 which terminates in a piston 522 that is slidably mounted in a cylinder 523 formed in the carrier. The piston has an axial splinder bore 524 in which fits a splined stud 525.

The stud 525 is formed integral with the cylinder head 526, the cylinder head being attached to the cylinder by bolts 527. The cylinder head also has integrally formed therewith a stud shaft 528 which is journaled in anti-friction bearings 529. A nut 530, Figure 4A, is threaded on the end of the shaft for clamping the shaft to the inner race of the bearing. The outer race of the bearing is clamped in a recess 531 formed in the wall 532 by a cap 533. This construction holds the cylinder against axial movement while permitting rotation thereof, the cylinder being rotatable in bore 534.

In order to impart rotation to the cylinder one end of it has a gear 535 integrally formed therewith and this gear intermeshes with a pinion 536 which is attached to the end of a shaft 537. This shaft extends to the outside of the carrier where it is provided with a manually operable hand wheel 538. The hand wheel serves to effect manual adjustment of the quill, the drive being from the pinion 536 through the gear 535, thereby imparting rotation to the cylinder and since the stud 525 is formed integral with the piston head the stud will rotate, thereby imparting rotation to the piston head 522 and its piston rod 521. Since the piston rod has a spiral worm thread 520 formed thereon, rotation of this thread will impart rotation to the gear 519, and thereby through the screw and nut connection 517, 516, the quill will be moved axially. Power shifting of the quill is obtained by reciprocating the piston 522 in the cylinder 523 whereby the thread 520 then acts as a rack to impart rotation to the pinion 519.

Referring to Figure 2, fluid pressure is supplied to the quill clamping piston 503 and the quill actuating piston 522 from a pair of lines 539 and 512. These channels are in the carrier and since the source of pressure is outside of the carrier they are connected by a pair of sliding trombone connections 541 and 542 to channels 543 and 544 which are located in the bed.

The normal operating position of the quill is its advanced position which is effected by the piston 522 when at the right hand end of the cylinder 523, as shown in Figure 2, and the quill is clamped. This is the position utilized for cutting. When the quill is to be retracted the connections are such that the quill is unclamped by the piston 503 and sequentially retracted by the piston 522. For advancement of the quill, the piston 522 is actuated first, and then the piston 503 is sequentially actuated to effect the clamping. This is automatically accomplished by providing a pair of delay valves 545 and 546, the valve 545 serving to delay the advance of piston 522 until the unclamping has been accomplished and the valve 546 serving to delay the clamping action until the piston 522 has completed its advancing movement. Since the parts are shown, however, in the position with the quill advanced and clamped, the unclamping and retraction will be explained first. This is accomplished by connecting the channel 512 to pressure and the channel 539 to exhaust. The pressure in channel 512 flows directly through the reversing valve 509 to port 547 of cylinder 504 which will cause the piston 503 to move in a direction to unclamp the quill.

The channel 512 has a branch connection 540 to port 548 of the delay valve 545. The valve plunger 549 is normally held in the position shown by a spring 550. The plunger has an annular groove 551 in which is formed an interdrilled passage 552 that communicates with the end of the valve whereby pressure may be built up to shift the plunger 549 against the resistance of spring 550. This spring is strong enough to hold the valve in the position shown and against the pressure necessary to effect unclamping.

After the unclamping has been accomplished, the pressure increases, overcoming the resistance of spring 550 and shifting the plunger 549 sufficiently for the annular groove 551 to interconnect the port 548 with port 553. This port is connected by channel 554 to port 555 located in the forward end of the cylinder 523. The quill being unclamped, this permits the pressure to shift the piston 522 to the other end of the cylinder. The port 556 at the other end of the cylinder 523, it will be noted, is connected directly to channel 539 which is a reservoir channel, thereby permitting the free escape of fluid.

The fluid escaping from the end of the clamping cylinder 504 through the port 557 passes through channel 508 and the reversing valve 509 to channel 513. It will be noted that this channel terminates in a port 558 of delay valve 546. This valve has an annular groove 559 which permits the oil to continue to a check valve 560 which is forced open by the escaping fluid whereby the fluid continues through channel 561 to the annular groove 562 associated with the port 556 whereby the fluid may continue to reservoir through the channel 539.

Upon reversing the connections to channels 539 and 540 whereby the channel 539 becomes the pressure channel, it will be apparent that the fluid will be immediately admitted to cylinder 523 shifting the piston 522 to advance the quill and then the fluid will continue through the channel 561 to port 563 of the delay valve 546, this being necessary because the check valve 560 will close due to the direction of flow of the liquid. The plunger 564 of this valve is normally held in the position shown by a spring 565 but is provided with an annular groove 567 and an interdrilled passage 568 whereby the fluid may pass to the chamber 569 and effect shifting of the plunger to effect interconnection of port 563 with port 558. The fluid will then continue through channel 513, valve 509 and channel 508 to effect clamping of the quill.

A pair of channels 570 and 571 serve to control hydraulic operation and hydraulic clamping of the carrier in the same manner that the quill was controlled in the sense that the normal operating position of the carrier is its lower position with the piston 447 at the bottom of the cylinder 446 and the carrier clamped. The carrier is elevated by first unclamping it and then actuating the piston 447 upward which moves the carrier to an upper unclamped position. Upon reversing the connections to channels 570 and 571 the carrier is moved down and then clamped. The delay operation of the carrier and the clamp is accomplished by providing a pair of delay valves 572 and 573 having plungers 574 and 575 which are normally held in the position shown by springs 576.

When the carrier is unclamped, pressure exists in channel 570 and channel 571 is connected to exhaust. Upon reversal of these connections the pressure entering channel 571 continues direct to the unclamping cylinder through the reversing valve and channel 477 and after the unclamping has been effected the pressure rises in channel 571 which is communicated to port 577 of the delay valve 572. This port is connected by means of the annular groove 578 and the interdrilled passage 579 in the plunger 574 to the chamber 580 whereby the pressure can act on the end of plunger 574 and shift the same against the resistance of spring 576. This effects interconnection of port 577 with port 581 whereby the fluid may continue through channel 582 to the lower end of cylinder 446, causing upward movement of the piston 447. The fluid exhausting from the upper end of the cylinder 446 passes through the channel 570 direct to reservoir. The fluid exhausting from the upper end of the clamping cylinder passes through channel 476, the reversing valve 480 and channel 583 to the check valve 584 which is so positioned as to open for this direction of fluid flow so that the fluid will continue to channel 570 and thereby to exhaust.

Upon reversal of the connections fluid pressure flows through channel 570 immediately causing downward movement of the piston 447 and then as the pressure rises it is communicated to port 585 of delay valve 573. This valve is connected through the annular groove 586 and the interdrilled passage 587 to chamber 588. The rise in pressure in chamber 588 shifts the plunger 575 against the resistance of spring 576 and interconnects the port 585 with port 589 whereby the fluid may continue through channel 583 to the clamping cylinder, thereby clamping the carrier after it has completed its movement.

It will now be seen that there is a pair of channels 543 and 544 which control fluid operation of the quill and its clamping mechanism, and another pair of channels 570 and 571 which control hydraulic actuation of the carrier and its clamping mechanism.

These four channels are connected to a selector valve 590 which serves to connect either one pair or the other of these channels to a trip controlled valve 591, and at the same time maintain a pressure connection to the proper one of the other pair of channels which will hold the particular mechanism in its normal clamped position.

For convenience of explanation, the selector valve 590 is shown in sections in Figure 2 and these sections have been numbered consecutively from 592 to 597. The channel 543 is connected to port 598 of section 593; the channel 544 is connected to port 599 of section 596; the channel 570 is connected to port 600 of section 593 and the channel 571 is connected to port 601 of section 596. This valve has a rotatable plunger 602 to which is attached an operating knob 603 which has three positions indicated by the arrows 604, 605, and 606.

Pressure is supplied for operating these devices by a pump 607 which has a delivery channel 608 which is connected to port 609 of section 592 of the selector valve. This pump has an intake 610 through which fluid is withdrawn from a reservoir 611 through a suitable filter 612. For emergency purposes a check valve 613 may be interposed between the channels 608 and 610. The selector valve is shown in its off position whereby the fluid entering port 609 flows into the annular groove 614 of section 592 and thereby to the arcuate grooves 615 and 616 of section 593, these grooves forming part of the annular groove.

From this it will be seen that the pressure is connected to both channels 543 and 570, the former leading to the quill mechanism to hold it in its clamped position, and the latter extending to the carrier mechanism to hold it in its clamped position. The return channels are connected to arcuate grooves 617 and 618 of section 596 which directly communicate with the annular groove 619 in section 597. The port 620 connects this groove to the return channel 621 whereby fluid may return to the reservoir 611.

When the selector valve plunger is rotated in a counterclockwise direction to the position 604 which is known as the quill position, the port 600 is still in communication with the arcuate groove 616 but the port 598 is connected to a longitudinally extending groove 622. This groove intersects an annular groove 623 in section 594 which has a port 624, connected by channel 625 to port 626 of the trip controlled valve 591. Similarly, the port 601 in section 596 remains connected to the exhaust groove 618 but the port 599 becomes connected to a longitudinally extending groove 627 which intersects annular groove 628 in section 595. This annular groove is connected by port 629 and channel 630 to port 631 of the trip controlled valve.

It will now be seen that upon rotation of the selector valve plunger 602 to the quill position that the same connections are maintained to the carrier channels 570 and 571 while the quill control channels 543 and 544 are connected through the selector valve to the trip controlled valve 591. The trip controlled valve has a rotatable plunger 632 to the reduced end of which is attached an operating lever 633. This lever is semi-circular in shape to provide a surface 634 for engagement by a trip plunger 635, a surface 636 which is engageable by a trip plunger 637 and a lug 638 which engages a slot in a manual control plunger 639. The plunger, of course, is adapted to move the valve to either one of two positions, while the trip plunger 635 effects counterclockwise rotation of the valve and the trip plunger 637 effects clockwise rotation of the valve.

This trip valve is located in the bed of the machine adjacent to the carrier side of the table, and the table is provided with a dog carrying T-slot 640 in which suitable trip dogs 641 are adjustably mounted.

The trip valve is shown in three sections, the section 642 having a pressure port 643 which is supplied by line 608, and a section 644 which has an exhaust port 645 that is connected to the return channel 621. The section 642 has an annular groove 646 which is intersected by a pair of axial extending grooves 647 and 648 that terminate in section 632. In section 644, the plunger 632 is provided with another annular groove 649 which has four axial extending grooves 650 that also terminate in section 632 whereby the two pressure grooves are flanked by a pair of exhaust grooves. It will now be apparent that upon rotation of the valve 632 in a clockwise direction that port 626 will be connected to pressure, and port 631 will be connected to exhaust.

Thus, the trip valve serves as a reversing valve to alternately connect the channels 625 and 630 to pressure and reservoir. Then, depending upon the position of the selector valve, these two channels may be connected to either the pair of channels which control operation of the quill, or the pair of channels which control the operation of the carrier.

There has thus been provided a new and improved mechanism for automatically positioning the spindle of a milling machine either axially or laterally from one position to another in synchronization with the movements of a work table. This makes possible automatic cycling of a milling machine whereby the work table may be traversed to a start cutting position at which the spindle is shifted from an inoperative to an operative position so that continued movement of the table will effect a machining operation, at the end of which the spindle is returned to its inoperative position, so that upon return movement of the work table there will be no rubbing contact between the cutter and the work. It will be understood that the axial shifting movement is more useful when end mills are attached to the spindle and that lateral shifting will be used with circular cutters. It will also be apparent that this mechanism may be used for intermittent cutting in two different planes when after machining in one plane, the cutter is shifted for machining in a second plane.

What is claimed is:

1. In a milling machine having a reciprocable table, a rotatable tool spindle and a spindle carrier for supporting said spindle for movement toward and from the table, the combination of fluid operable means for shifting said carrier between a non-working position and a working position, fluid operable means for clamping said carrier in its working position, a control valve supported for trip operation by the table, a pair of control channels, a source of pressure, means operable by the valve for alternately connecting said source of pressure to said channels, one of said channels being directly connected to the fluid operable means for the carrier, the other channel being directly connected to the fluid operable clamping means, and delay valve and check valve means cross-connecting said channels to the other fluid operable means whereby when one of said channels is under pressure the spindle carrier will be moved first and then clamped, and when the other channel is under pressure the clamping means will be unclamped first and then the carrier moved.

2. In a milling machine having a reciprocating table, a carrier, a rotatable tool spindle, a quill for supporting said spindle in the carrier for movement relative to the table, the combination of fluid operable means for shifting said quill from a non-working position to a working position, fluid operable means for clamping said quill, a control valve supported for trip operation by the table, a pair of control channels, a source of pressure, means operable by the valve for alternately connecting said source of pressure to said channels, one of said channels being directly connected to one of said fluid operable means, the other channel being directly connected to the other fluid operable means, and delay and check valve means cross-connecting said channels to the opposite fluid operable means whereby when one of said channels is under pressure the spindle quill will be moved first and then clamped, and when the other channel is under pressure the quill will be unclamped and then moved.

3. In a milling machine having a work support, and a tool spindle supported for lateral and axial movement, the combination of separate fluid operable means for effecting the respective movements, a reversing valve supported for trip operation by said work support, and means to selectively connect said valve to either of said fluid operable means.

4. In a milling machine having a reciprocable work supporting table, and a spindle carrier, the combination of fluid operable means for shifting said carrier between a working position and a non-working position, a quill mounted in said carrier and having means for rotatably supporting a spindle, fluid operable means for shifting said quill between a working position and a non-working position, a source of pressure, and a control valve having a position for simultaneously connecting said source of pressure to both of said fluid operable means in a manner to move and hold both the quill and the carrier in their respective working positions.

5. In a milling machine having a reciprocable work supporting table, and a spindle carrier, the combination of fluid operable means for shifting said carrier between a working position and a non-working position, a quill mounted in said carrier and having means for rotatably supporting a spindle, fluid operable means for shifting said quill between a working position and a non-working position, a source of pressure, a control valve having a position for simultaneously connecting said source of pressure to both of said fluid operable means in a manner to move and hold both the quill and the carrier in their respective working positions, a trip operated control valve, and means to alternately position the first-named valve for selectively connecting either of said fluid operable means to said trip controlled valve while still maintaining pressure on the other fluid operable means.

6. In a milling machine having a reciprocating table, a rotatable tool spindle, and a carrier for supporting said spindle for relative movement with respect to said table, the combination of fluid operable means for shifting said carrier between a working and a non-working position, manually operable means for adjusting said carrier while in either position, fluid operable means for clamping said carrier, a source of pressure, a control valve, a pair of control channels alternately connectible by said valve to said source of pressure whereby one of said channels is always under pressure, means connecting said channels in parallel to said fluid operable means for joint control by said valve, and separate means for reversing the connections between said channels and said fluid operable clamping means whereby said clamping means may be released for manual adjustment of said carrier.

7. In a milling machine having a reciprocating table, a rotatable tool spindle, and a carrier for supporting said spindle for relative movement with respect to said table, the combination of fluid operable means for shifting said carrier between a working and a non-working position, a pair of control channels for said fluid operable means, fluid operable means for clamping said carrier, a second pair of control channels therefor, a source of pressure, a control valve having a pair of channels connected in parallel to the respective pairs of first-named channels, a delay valve interposed in one of said connections for delaying operation of said clamping means until the spindle carrier has moved to a working position, and a second delay valve interposed in the other connections for delaying movement of the spindle carrier to a non-working position until the unclamping means have been actuated.

8. In a milling machine having a bed, a table reciprocably mounted on said bed, a spindle carrier supported for movement toward and from the table, a quill reciprocably mounted within the carrier and having a tool spindle rotatably journalled therein and movable therewith, fluid operable means for shifting said quill including a piston and piston rod, said piston rod having a screw thread formed thereon, a spiral gear intermeshing with said thread, means to admit pressure to said piston for power shifting of said quill, and manually operable means for rotating said piston rod to effect manual adjustment of said quill while said piston is under pressure.

ERWIN G. ROEHM.
HANS FRITSCHI.

REFERENCES CITED

The following references are of record in the file of this patent:

UNITED STATES PATENTS

| Number | Name | Date |
|---|---|---|
| 1,763,142 | Ernst | June 10, 1930 |
| 1,976,108 | Archea | Oct. 9, 1934 |
| 1,978,360 | Archea | Oct. 23, 1934 |
| 2,012,249 | Sassen | Aug. 20, 1935 |
| 2,293,880 | Armitage et al. | Aug. 25, 1942 |
| 2,356,796 | Purvin | Aug. 29, 1944 |
| 2,368,061 | Wortendyke | Jan. 23, 1945 |